(12) United States Patent
Barlow et al.

(10) Patent No.: US 7,624,998 B2
(45) Date of Patent: Dec. 1, 2009

(54) HANDLE HEIGHT ADJUSTMENT FOR WALK BEHIND MOWER

(75) Inventors: Dale V. Barlow, Dublin, GA (US);
Michael A. Scott, Dublin, GA (US);
Randy Kent Hall, Dublin, GA (US);
Keith Moxley, Dublin, GA (US); Ed Colber, Dublin, GA (US)

(73) Assignee: Husqvarna Aktiebolag, Huskvarna (SE)

( * ) Notice: Subject to any disclaimer, the term of this patent is extended or adjusted under 35 U.S.C. 154(b) by 120 days.

(21) Appl. No.: 11/928,600

(22) Filed: Oct. 30, 2007
(Under 37 CFR 1.47)

(65) Prior Publication Data
US 2009/0094956 A1 Apr. 16, 2009

Related U.S. Application Data

(62) Division of application No. 11/270,409, filed on Nov. 9, 2005.

(51) Int. Cl.
*B62B 3/00* (2006.01)
*B62B 11/00* (2006.01)

(52) U.S. Cl. .................................. 280/47.371

(58) Field of Classification Search ................ 56/16.7, 56/14.7, 1, DIG. 18; 280/47.371, 650, 642; 74/551.3, 555.1, 544, 546, 547; D8/331, D8/330, 338, 341, 343, 344, 308, 88; D21/694
See application file for complete search history.

(56) References Cited

U.S. PATENT DOCUMENTS

| | | | | |
|---|---|---|---|---|
| 1,441,144 A | * | 1/1923 | Cutler | 56/249 |
| 3,084,949 A | * | 4/1963 | Forster et al. | 280/650 |
| 3,694,855 A | * | 10/1972 | Meyer et al. | 16/437 |
| 4,586,399 A | * | 5/1986 | Kassai | 74/551.3 |
| 5,184,835 A | * | 2/1993 | Huang | 280/47.371 |
| 5,261,215 A | * | 11/1993 | Hartz et al. | 56/11.9 |
| 5,625,923 A | * | 5/1997 | Huang | 16/429 |
| 5,636,504 A | * | 6/1997 | Kaley et al. | 56/1 |
| 6,098,492 A | * | 8/2000 | Juchniewicz et al. | 74/551.3 |
| D446,440 S | * | 8/2001 | Webber et al. | D8/331 |
| 6,347,777 B1 | * | 2/2002 | Webber et al. | 248/354.1 |
| 7,097,380 B2 | * | 8/2006 | Lee | 403/109.2 |
| 7,231,755 B2 | * | 6/2007 | Clarke | 56/14.7 |

* cited by examiner

*Primary Examiner*—Árpád Fábián-Kovács
(74) *Attorney, Agent, or Firm*—Pearne & Gordon LLP

(57) ABSTRACT

A movable power implement is provided for operation by an operator positioned adjacent to the implement and the operator directs the implement via a handle of the implement. The implement includes a lower portion having a base, a motor located on the base, a driven operational mechanism operatively connected to the motor for driven operation, a first handle portion connected to the base, a second handle portion connected to the first handle portion, and a handle height adjustment apparatus. The handle height adjustment apparatus includes a connection mechanism adjustably connecting the second handle portion to the first handle portion. The connection mechanism includes a first pin located on one of the first and second handle portions and a plurality of pin receptacles located on the other of the first and second handle portions. The first pin is locatable into a respective pin receptacle for each respective adjusted position of the second handle portion. The connection mechanism includes a cam movable between a locked position in which the cam holds the first pin locked into one of the plurality of pin receptacles and an unlocked position where the cam permits the first pin to be disengaged from the plurality of pin receptacles for movement of the first pin to any of the plurality of pin receptacles.

6 Claims, 7 Drawing Sheets

HANDLE HEIGHT ADJUSTMENT FOR WALK BEHIND MOWER

CROSS-REFERENCE TO RELATED APPLICATIONS

This application is a divisional and a continuation-in-part application of application Ser. No. 11/270,409, filed, Nov. 9, 2005, the entire disclosure of which is hereby incorporated herein by reference.

FIELD OF THE INVENTION

The present invention relates generally to a handle height adjustment for a lawn mower or other movable power implement.

BACKGROUND OF THE INVENTION

Movable power implements, such as lawn mowers, often have operators who walk with the implement. Movable power implements typically have handles for the operator to move the implement. Different operators for the implements can have varying heights. It is desired to provide a simple, improved handle height adjustment for an implement so as to accommodate operators of varying heights.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a movable power implement is provided for operation by an operator positioned adjacent to the implement and the operator directs the implement via a handle of the implement. The implement includes a lower portion having a base, a motor located on the base, a driven operational mechanism operatively connected to the motor for driven operation, a first handle portion connected to the base, a second handle portion connected to the first handle portion, and a handle height adjustment apparatus. The handle height apparatus includes a connection mechanism adjustably connecting the second handle portion to the first handle portion. The connection mechanism includes a first pin located on one of the first and second handle portions and a plurality of pin receptacles located on the other of the first and second handle portions. The first pin is locatable into a respective pin receptacle for each respective adjusted position of the second handle portion. The connection mechanism includes a cam movable between a locked position in which the cam holds the first pin locked into one of the plurality of pin receptacles and an unlocked position where the cam permits the first pin to be disengaged from the plurality of pin receptacles for movement of the pin to any of the plurality of pin receptacles.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
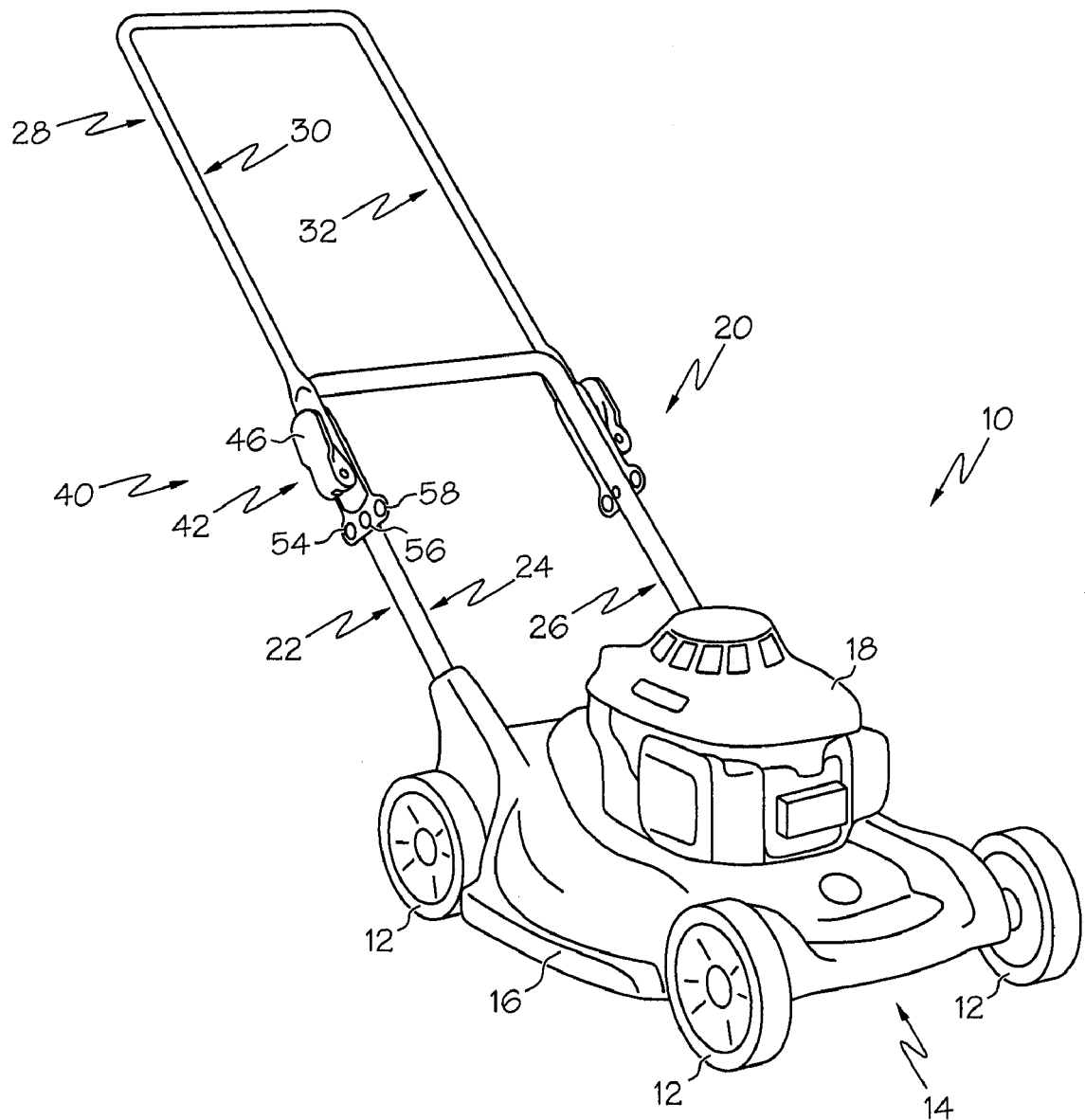
FIG. 1 is a perspective view of a movable power implement that includes a first example handle height adjustment apparatus with three pin receptacles.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

An example of the subject invention is shown in FIG. 1, as a movable power implement 10 that includes a handle height adjustment apparatus 40. The movable power implement 10 can be moved by an operator who directs the implement 10 by a handle 20 of the implement 10. The handle height adjustment apparatus 40 can accommodate users of varying heights. FIG. 1 shows an example movable power implement 10 which is a lawn mower. It is appreciated that other movable power implements such as tillers, aerators, edgers, trimmers, seeding implements, mulchers, blowers, vacuums, etc. can also use the handle height adjustment apparatus. The example movable power implement 10 includes a plurality of wheels 12 to facilitate movement of the implement 10. The plurality of wheels 12 are not a limitation on the invention as the movable power implement 10 can include other structure to move the implement 10. The movable power implement 10 also includes a lower portion 14. The lower portion 14 includes a base 16. The base 16 can be formed from many different shapes and materials and the illustration in FIG. 1 is just one example of a base 16. A motor 18 is located on the base 16 and can be mounted to the base in any manner. It is appreciated that the motor 18 can be located within a housing. A driven, operational mechanism (not shown) can be mounted to the base 16 or can be mounted partially within the base 16. The driven, operational mechanism is operatively connected to the motor 18 for driven operation. Examples of driven, operational mechanisms that can be used include saws, blades, cutters, a suction fan, a blower, rotating tines, etc.

The handle 20 of the movable power implement includes a first handle portion 22 and a second handle portion 28. The first handle portion 22 is connected to the base 16 and the second handle portion 28 is connected to the first handle portion 22. The first handle portion 22 can be connected to the base 16 using fasteners, screws, glue, welding, or other attachment methods, or can even be formed integrally with the base 16.

The first handle portion 22 can include a first side 24 and a second side 26 and the second handle portion 28 can include a first side 30 and a second side 32. The second handle portion 28 can be connected along its first side 30 to the first side 24 of the first handle portion 22. The second handle portion 28 can also be connected along its second side 32 to the second side 26 of the first handle portion 22. The first side 24 and the second sides 26 of the first handle portion 22 can be connected to each other or be separate. The first side 30 and the second side 32 of the second handle portion 28 can be connected to each other or be separate. In the shown example, both the first handle portion 22 and the second handle portion 28 can have shapes that are generally U-shaped configurations, as shown in FIG. 1 when the handle portions 22, 28 have multiple sides. Other shapes for the handle portions 22, 28 are contemplated and the first handle portion 22 and the second handle portion 28 can each have different shapes than as shown and different from each other.

Figure 5:
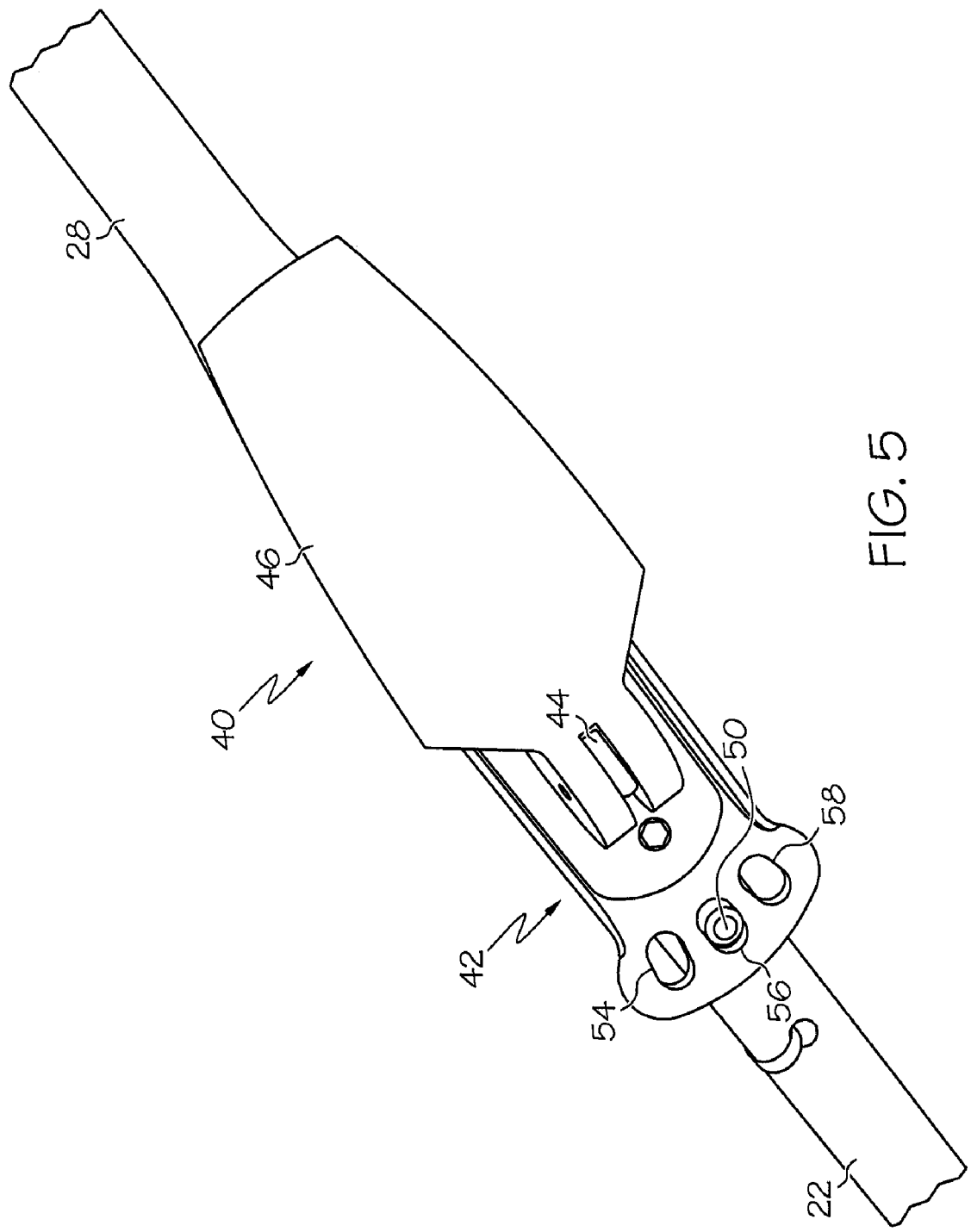
FIG. 5 is an enlarged opposite side view of the first example handle height adjustment apparatus of FIG. 1.

The handle height adjustment apparatus 40 is provided with a first pin receptacle 54, a second pin receptacle 56, and a third pin receptacle 58 in the first example. FIG. 5 shows a larger view of the first example with three pin receptacles 54, 56, 58. The example shows the pin receptacles 54, 56, 58 located in an arc about a rotation point, where the adjustment of the second handle portion 28 includes rotation of the second handle portion 28 relative to the first handle portion 22 about a rotation point. Alternatively, a plurality of receptacles located along a plurality of orientations can also be included. In other examples, four, five, or even more receptacles can be included. The pin receptacles can be shaped as generally circular apertures, generally oval slots, or other shaped apertures to house different shaped pins.

The handle height adjustment apparatus 40 includes a connection mechanism 42. The connection mechanism 42 adjustably connects the second handle portion 28 to the first handle portion 22. The connection mechanism 42 is configured for securing and releasing the second handle portion 28 with respect to a particular pin receptacle 54, 56, 58. The connection mechanism 42 also includes a cam 46 movable between a locked position and an unlocked position. The example of FIG. 1 shows a perspective view illustrating a handle height adjustment apparatus 40 that includes the connection mechanism 42 that connects the first handle portion 22 and the second handle portion 28.

Figure 2:
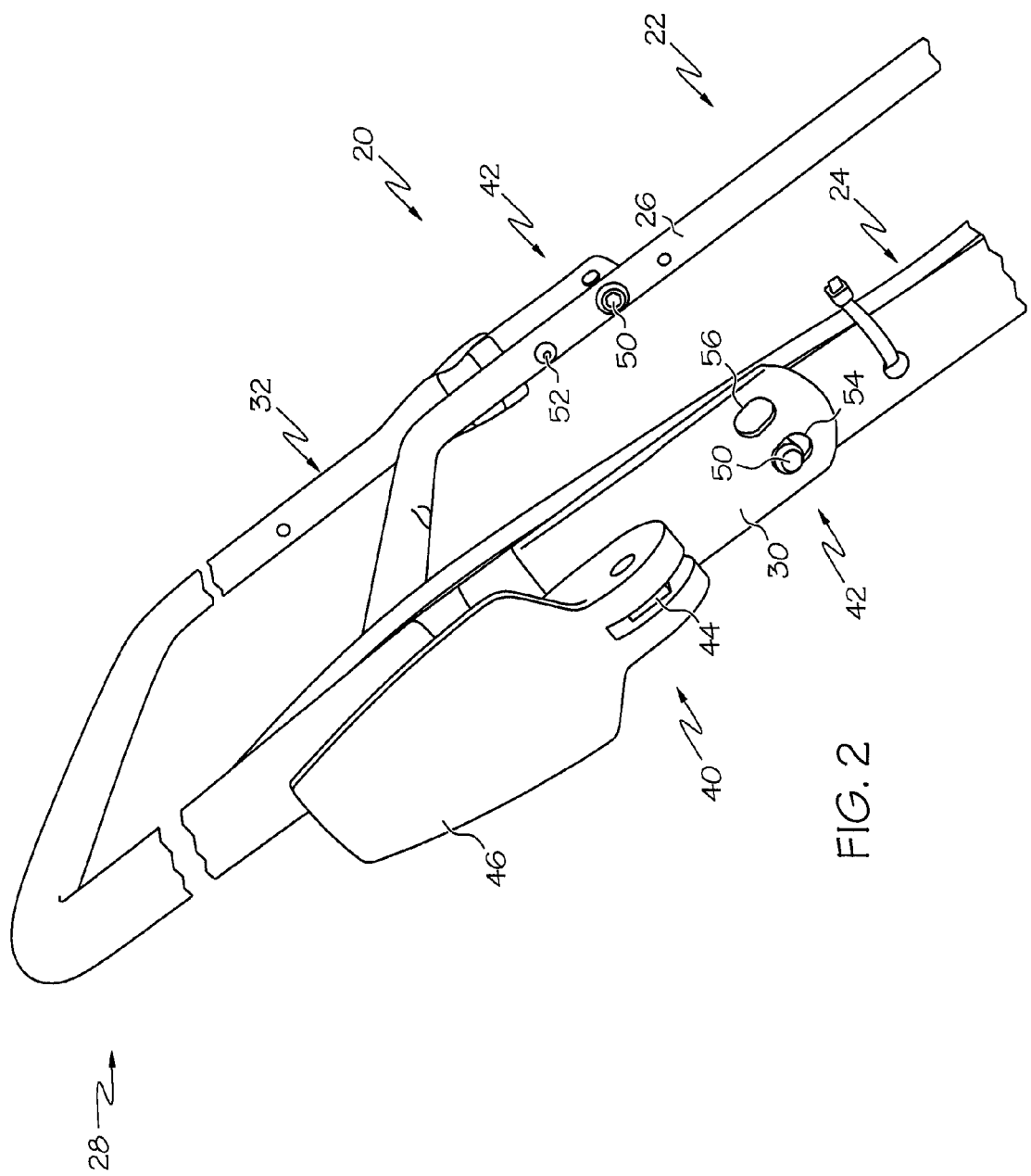
FIG. 2 is a side view of just a portion of a movable power implement that includes a second example handle height adjustment apparatus that includes two pin receptacles.

Turning to FIG. 2, a second example of an arrangement for the handle height adjustment apparatus 40 is shown. This second example differs from the first example of FIG. 1 and FIG. 5 only with respect to the fact that only two pin receptacles 54, 56 are included. The connection mechanism 42 includes a first pin 50 that is located on one of the first 22 and second handle portions 28. A plurality of pin receptacles 54, 56 are located on the other of the first 22 and second handle portions 28. In this example, the first pin 50 is located on the first handle portion 22 and the receptacles are located on the second handle portion 28. Of course, it has been contemplated that these positions could be reversed and the first pin 50 can be located on the second handle portion 28 and can be locatable into pin receptacles 54, 56 on the first handle portion 22.

The shape of the first pin 50 being round in FIG. 2 is by example only. Accordingly, the shape of the first pin 50 and the pin receptacles 54, 56 can also have varying shapes. The first pin 50 is locatable or inserted into a respective pin receptacle 54, 56 for each respective adjusted position of the second handle portion 28. In other examples, varying orientations, shapes, and amounts of pin receptacles can be provided for the handle height adjustment apparatus 40.

Figure 3:
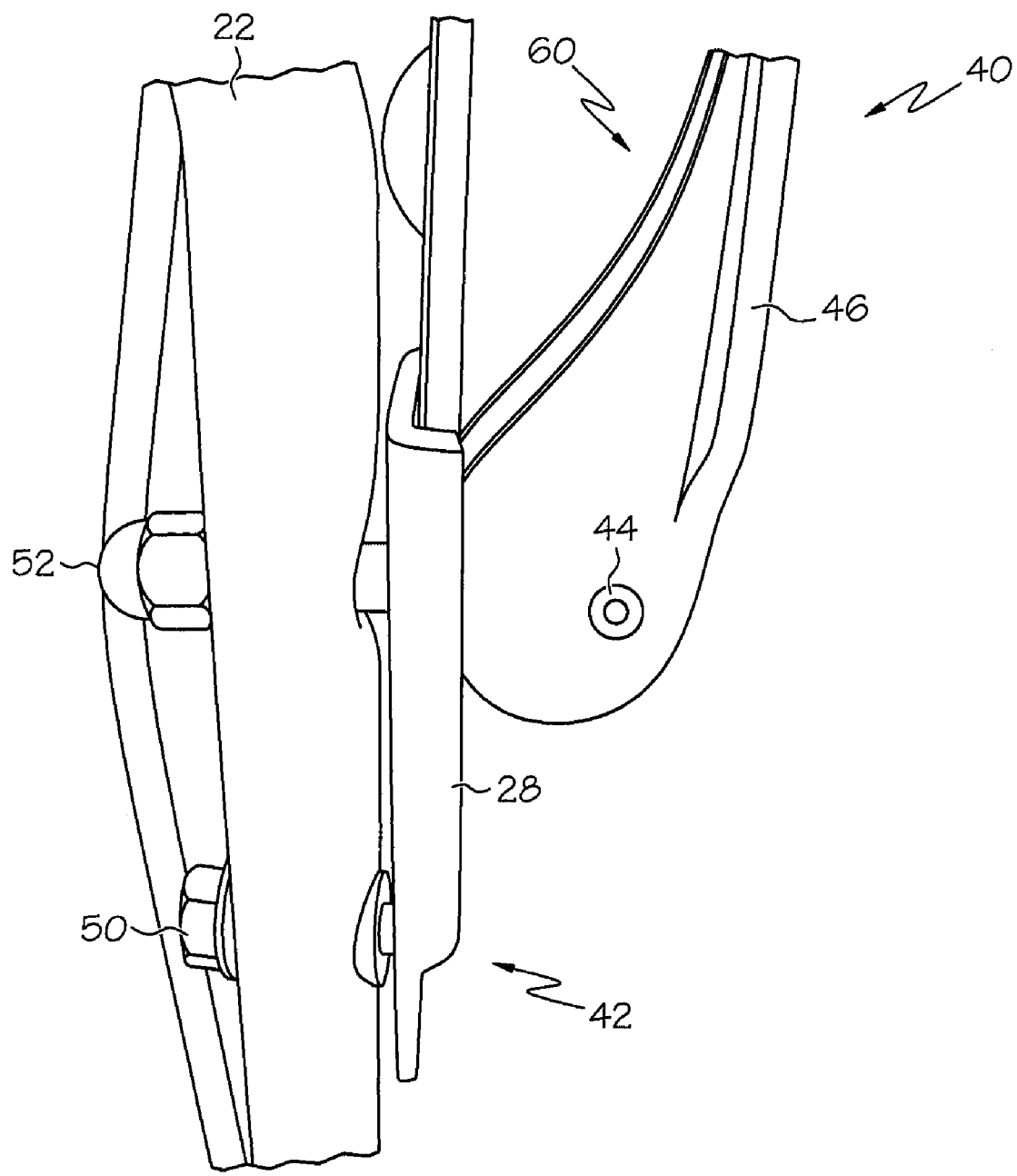
FIG. 3 is an enlarged rear view of the second example handle height adjustment apparatus of FIG. 2 with a cam in a locked position that includes two pin receptacles.

The handle height adjustment apparatus 40 is configured in the second example to allow the second handle portion 28 to be rotated (e.g., either clockwise or counter-clockwise) about the first handle portion 22, as seen in FIG. 2. With this example structure, the second handle portion 28 can rotationally adjust (e.g., either clockwise or counter-clockwise) about a connecting fastener 52 that connects the first handle portion 22 and the second handle portion 28. Thus, the connecting fastener 52 is an example of a rotation point. The first pin 50 and the connecting fastener 52 protrude from the first handle portion 22 in this example. FIG. 3 shows an example length of the first pin 50 and the connecting fastener 52. The connecting fastener 52 and the first pin 50 can have varying lengths from each other aside from the lengths selected in the example of FIG. 3. The connecting fastener 52 can be a pin, similar to the first pin 50 that engages the pin receptacles. Alternatively, the connecting fastener 52 can include other types of fasteners of various shapes. Based on which receptacle 54, 56 is selected, the second handle portion 28 is moved to a different adjusted position. The second handle portion 28 can thus be adjusted relative to the first handle portion 22.

It is appreciated that a second connection mechanism 42 can be provided to connect the second side 26 of the first handle portion 22 and the second side 32 of the second handle portion 28, as partially seen in FIG. 2. The second connection mechanism 42 can also include a plurality of receptacles and can include any of the examples described for the first connection mechanism 42. The second connection mechanism 42 includes a first pin 50 and a connecting fastener 52. One end of the first pin 50 and one end of the connecting fastener 52 can each be seen protruding in FIG. 2 from the second side 26 of the first handle portion 22. Alternatively, instead of a handle design with multiple sides, a first handle portion 22 can be adjustably connected to a second handle portion 28 where each handle portion 22, 28 includes only a first side 24, 30.

Figure 4:
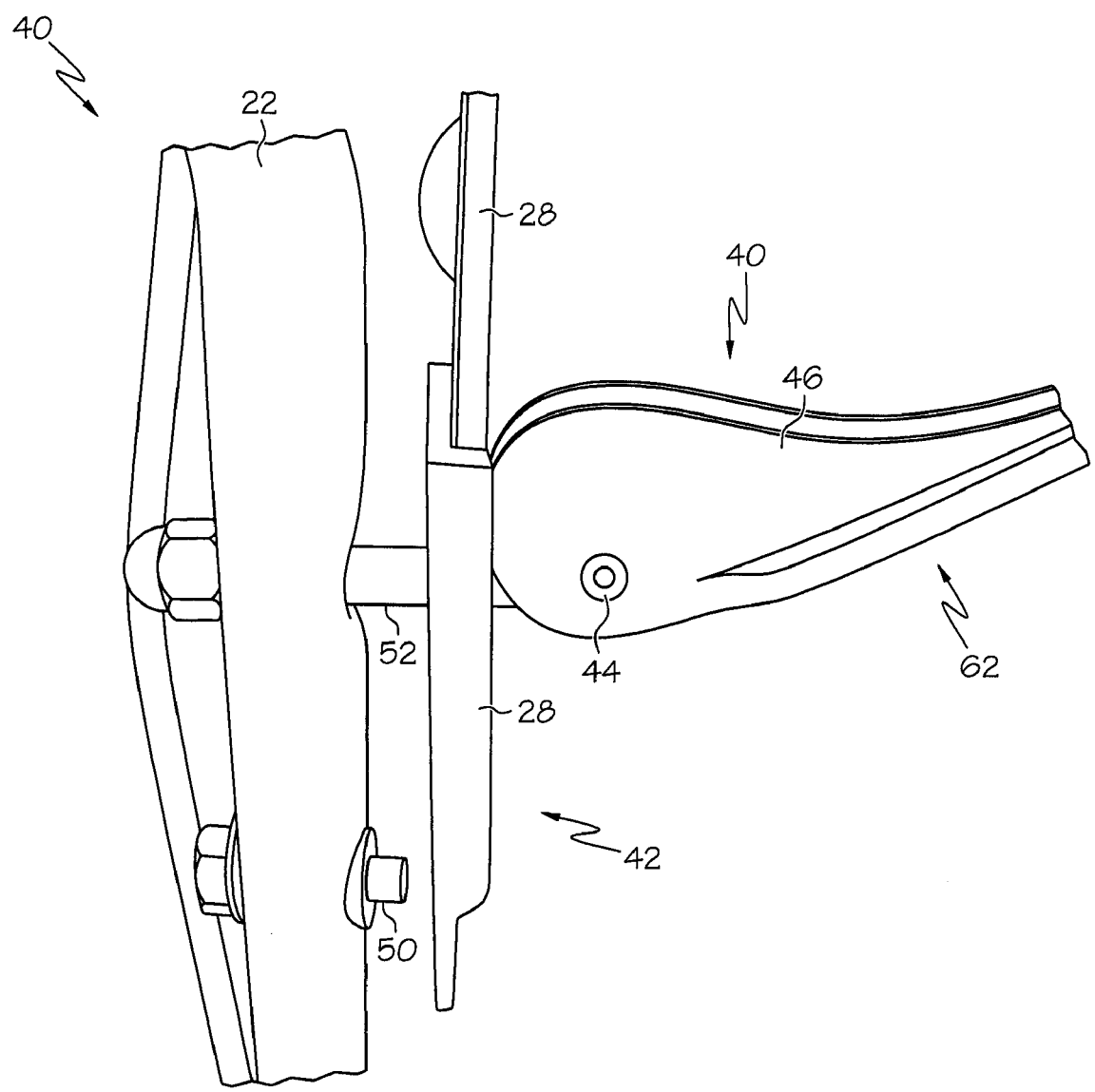
FIG. 4 is a rear view of the second example handle height adjustment apparatus of FIG. 2, but with the cam in an unlocked position.

In the example shown in FIGS. 2-4, the cam 46 is pivotally attached to a second pin 44. The cam 46 is pivotally movable about the second pin 44 to move from a locked position 60, shown in FIG. 3, into an unlocked position 62, as shown in the example in FIG. 4. The second handle portion 28 can be adjusted relative to the first handle portion 22 by changing the position of the first pin 50 with respect to one of the pin receptacles 54, 56 (see FIG. 2). The second pin 44 in this example is secured or formed integrally to the second handle portion 28. Of course, it has been contemplated that these positions could be reversed and the second pin 44 can be secured to the first handle portion 22. In the example of FIGS. 2-4, the cam 46 has a larger structure that is similar to a handle for a lever. It is appreciated that many types of shapes and structures can be used for the cam 46. While in the locked position 60, the connection mechanism 42 prevents rotational movement of the second handle portion 28 about the connecting fastener 52 due to the first pin 50 being placed in one of the pin receptacles 54, 56 (see FIG. 2) and the connection mechanism 42 preventing the first pin 50 from being displaced from one of the pin receptacles 54, 56. In this example, the connecting fastener 52 protrudes through a respective recess on the second handle portion 28 and into engagement with the cam 46.

As the cam 46 is placed in the locked position 60, a force is imparted on one of the first 22 or second handle portion 28 by the cam 46. In the example of FIGS. 3-4, an eccentric contact surface of the cam 46 in the locked position 60 causes the second handle portion 28 to have been moved towards the first handle portion 22. The distance between the second pin 44 and the second handle portion 28 is less in FIG. 4 than in FIG. 3 due to the eccentric contact surface of the cam 46. For example, the distance from the second pin 44 to the segment of the eccentric contact surface of the cam 46 abutting the second handle portion 28 is less in the unlocked position 62 than the distance from the second pin 44 to the segment of the eccentric contact surface of the cam 46 abutting the second handle portion 28 in the locked position 60. The connection mechanism 42 can also be spring-biased into the locked position 60.

In the locked position 60 shown in the example in FIG. 3, the cam 46 holds the first pin 50 locked into one of the pin receptacles 54, 56 (see FIG. 2) by imparting a force upon the second handle portion 28. In the shown example, the force occurs on the second handle portion 28, as the cam 46 is moved into the locked position 60 and a different segment of the eccentric contact surface abuts the second handle portion 28.

Each end of the cam 46 in FIG. 3 is in an orientation parallel to the shown segment of the second handle portion 28, which extends in a substantially vertical direction. Other examples can include different orientations and different axes of rotation for the cam 46 when it is in a locked position 60. In the shown example, the cam 46 moves about an axis perpendicular to a length of the shown segment of the second handle portion 28, which can make the handle height adjustment apparatus 40 easier to use for operators. It is appreciated that the cam 46 can be structured in different orientations to allow the cam 46 to move about other axes, whether or not perpendicular, relative to the second handle portion 28 or relative to the first handle portion 22.

In the unlocked position 62 seen in FIG. 4, the second handle portion 28 is moved away from the first handle portion 22 due to movement of the cam 46, and the first pin 50 is disengaged from the pin receptacle (not shown in this view) that the first pin 50 was in engagement with. A user of the handle height adjustment apparatus 40 can then rotate the second handle portion 28 and select a new pin receptacle for the connecting fastener 52. Selection of a different pin receptacle allows a user to select a height for the handle 20 that the user finds desirable. A number of geometries and orientations for the connection mechanism 42 can be provided to create the force that pushes against the second handle portion 28 when a cam 46 is placed in the locked position 60. It is appreciated that the discussion of the cam 46, the engagement of the first pin 50 being locatable into a respective pin receptacle, and the connecting fastener 52, can also be used with the first example of FIG. 1 and FIG. 5, which contains three pin receptacles 54, 56, 58.

Figure 6:
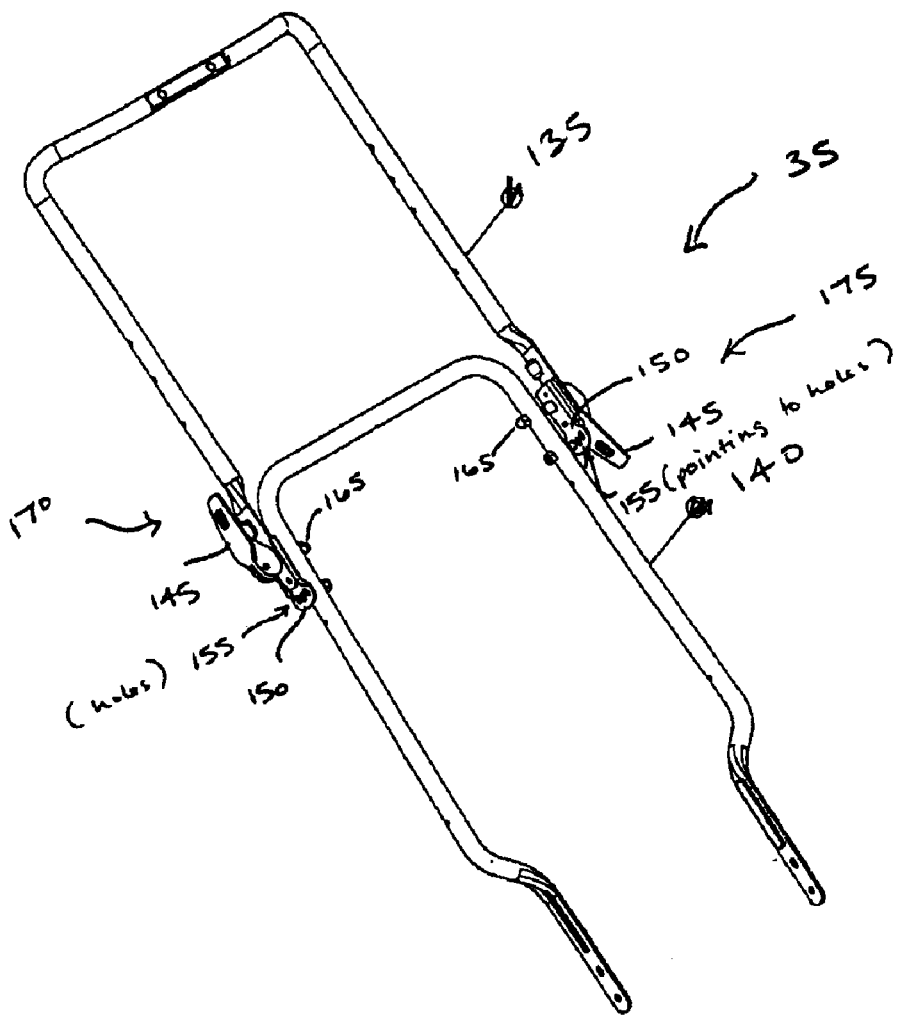
FIG. 6 is a view of a handle for a lawn mower in accordance with an aspect of the present invention.
Figure 7:
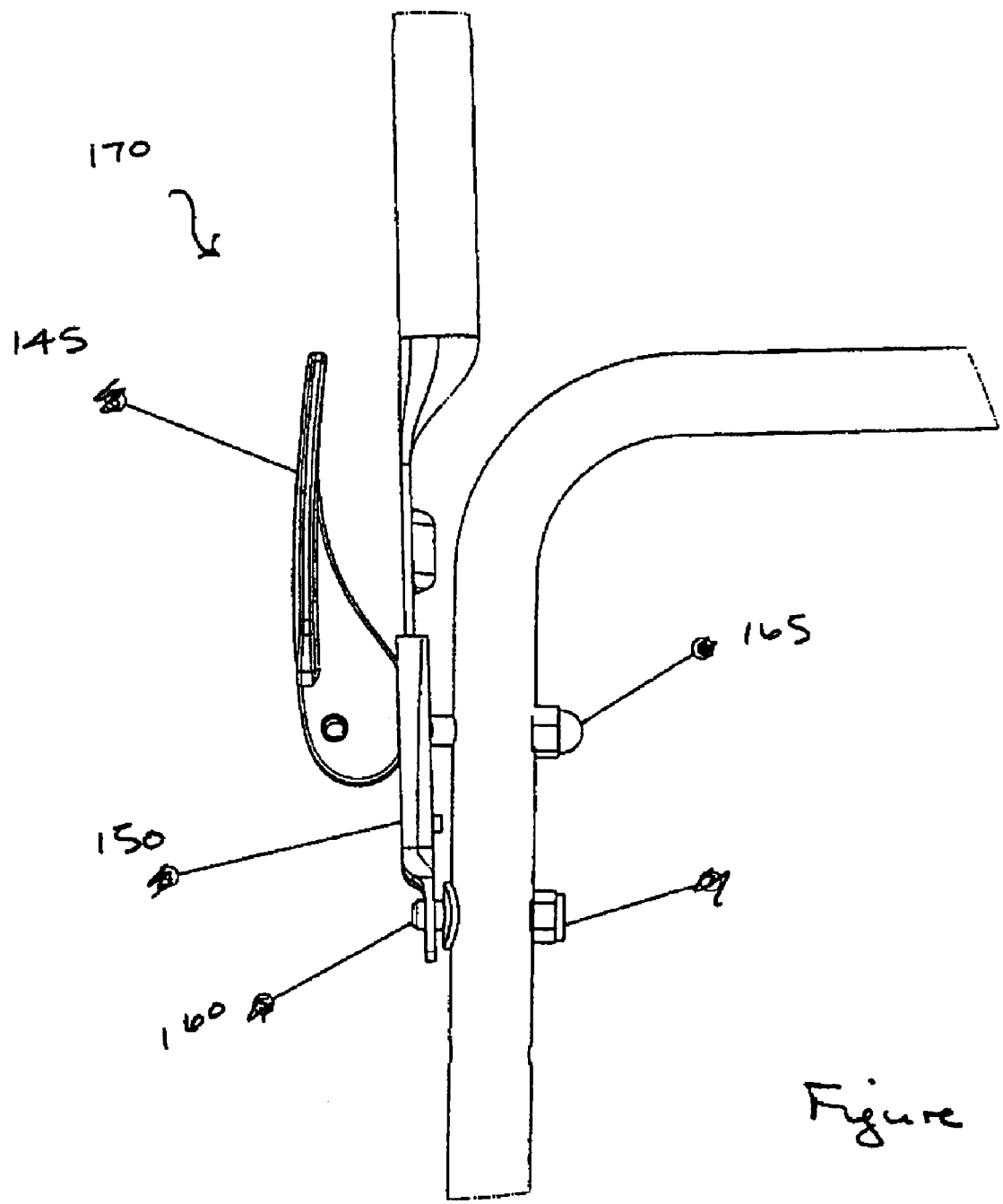
FIG. 7 is an enlarged view of a portion shown in FIG. 6.

Turning now to FIGS. 6 and 7, a handle 35 for a lawn mower is depicted in accordance with an aspect of the present invention. The handle 35 includes an upper member 135 and a lower member 140, wherein the upper member 135 is pivotally adjustable with respect to the lower member 140, which in turn, adjusts an overall height of the handle 35 when coupled to the lawn mower body. The upper and lower members 135, 140 are adjusted via a pair of quick adjust lever 145 and bracket 150 assemblies. Each of the brackets 150 includes two or more, preferably three, apertures 155 provided therethrough. The apertures 155 are adapted to receive a corresponding pin 160 extending through each of the legs of the lower member 140. The angle of the upper member 135 with respect to the lower member 140 is dependent upon which of the apertures 155 of the bracket 150 through which the pin 160 extends.

End portions of legs of the upper member 135 are adapted to couple to a mating portion of the corresponding brackets 150. The leg end portions of the upper member 135 and the corresponding brackets 150 are coupled between corresponding sides of the lower member 140 and corresponding quick adjust levers 145 via a pair of fasteners 165. The engagement between the quick adjust lever 145 and the corresponding fastener 165 is such that when the quick adjust lever 145 is in a first position 170, the upper member 135 and lower member 140 are biased together and the pin 160 is received through and engaged with a selected aperture 155. When the quick adjust lever 145 is in a second position 175, the lever 145 acts to bias the end portion of the upper member 135 away from the lower member 140 thereby disengaging the pin 160 from the previously selected aperture 155. In this position, the upper member 135 can be pivoted to a new position and the pin 160 can be aligned with a different selected aperture 155 to correspond with the new position. The quick adjust lever 145 is then moved back to the first position 170 to engage the pin 160 with the different selected aperture 155.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A movable power implement for operation by an operator positioned adjacent to the implement and directing the implement via a handle of the implement, the implement including:
    a lower portion having a base;
    a motor located on the base;
    a driven, operational mechanism operatively connected to the motor for driven operation;
    a first handle portion connected to the base;
    a second handle portion connected to the first handle portion at a rotation point for rotational movement of the second handle portion relative to the first handle portion and connected to prevent linear movement of the second handle portion relative to the first handle portion; and
    a handle height adjustment apparatus including a connection mechanism adjustably connecting the second handle portion to the first handle portion, the connection mechanism including a first pin located on one of the first and second handle portions and a plurality of pin receptacles arranged in an arc about the rotation point located on the other of the first and second handle portions, the first pin being locatable into a respective pin receptacle for each respective adjusted position of the second handle portion, and the connection mechanism including a cam movable between a locked position in which the cam holds the first pin locked into one of the plurality of pin receptacles and an unlocked position wherein the cam permits the first pin to be disengaged from the plurality of pin receptacles for movement of the first pin to any of the plurality of pin receptacles
    wherein an adjustment of the second handle portion includes rotation of the second handle portion relative to the first handle portion about the rotation point such that the adjustment of the second handle portion is in a clockwise direction or a counter-clockwise direction relative to the first handle portion.

2. A movable power implement according to claim 1, wherein a shape of the first handle portion is generally U-shaped and a shape of the second handle portion is generally U-shaped.

3. A movable power implement according to claim 1, wherein the cam moves about an axis perpendicular to a length of a segment of the second handle portion.

4. A movable power implement according to claim 1, wherein the connection mechanism adjustably connects the first handle portion and the second handle portion on a first side of the second handle portion; and the movable power implement further includes a second connection mechanism adjustably connecting the first handle portion and the second handle portion on a second side of the second handle portion.

5. A movable power implement according to claim 1, wherein the plurality of pin receptacles includes a first pin receptacle, a second pin receptacle, and a third pin receptacle.

6. A movable power implement according to claim 1, wherein the first handle portion includes only a first side and the second handle portion includes only a first side.

\* \* \* \* \*